(12) United States Patent
Iwamoto et al.

(10) Patent No.: US 12,252,038 B2
(45) Date of Patent: Mar. 18, 2025

(54) VEHICLE AND VEHICLE CONTROL METHOD

(71) Applicants: TOYOTA JIDOSHA KABUSHIKI KAISHA, Toyota (JP); SUBARU CORPORATION, Tokyo (JP)

(72) Inventors: Takami Iwamoto, Toyota (JP); Shun Nagai, Miyoshi (JP); Yuto Yokoyama, Miyoshi (JP); Junichi Katsumata, Susono (JP); Shotaro Arai, Okazaki (JP); Hiroki Maeda, Atugi (JP); Masahiro Hara, Gotenba (JP); Daigo Tateishi, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 305 days.

(21) Appl. No.: 17/967,594

(22) Filed: Oct. 17, 2022

(65) Prior Publication Data
US 2023/0120194 A1 Apr. 20, 2023

(30) Foreign Application Priority Data
Oct. 18, 2021 (JP) .................................. 2021-170489

(51) Int. Cl.
*B60L 7/10* (2006.01)
(52) U.S. Cl.
CPC ........... *B60L 7/10* (2013.01); *B60L 2240/423* (2013.01); *B60L 2240/465* (2013.01); *B60L 2250/26* (2013.01)

(58) Field of Classification Search
CPC ................. B60L 7/10; B60L 2240/423; B60L 2240/465; B60L 2250/26; B60W 30/18127
See application file for complete search history.

(56) References Cited

U.S. PATENT DOCUMENTS 5,472,265 A * 12/1995 Ohnuma ................... B60L 7/12
303/3
6,957,874 B2 * 10/2005 Hara ............... B60W 30/18109
180/165
2019/0061719 A1 * 2/2019 Higashi .................. B60T 13/20

FOREIGN PATENT DOCUMENTS

JP H09-294308 A 11/1997

* cited by examiner

*Primary Examiner* — Huan Le
(74) *Attorney, Agent, or Firm* — Dinsmore & Shohl LLP

(57) ABSTRACT

An ECU of a vehicle executes a regeneration process to control an electric motor so as to generate regenerative torque during deceleration caused by an accelerator OFF. The ECU executes a torque gradual decrease process to decrease the regenerative torque in a wheel slip detection state more gradually at a time when a brake pedal is depressed after a start of the deceleration and ABS control is not activated than a time when the brake pedal is not depressed after the start of the deceleration. The ECU executes a hydraulic pressure increase process to increase the upstream hydraulic pressure such that, when the ABS control is activated while the brake pedal is depressed after the start of the deceleration, the upstream hydraulic pressure has a value necessary for generating a braking torque having a magnitude according to the regenerative torque generated at a start of the ABS control.

5 Claims, 5 Drawing Sheets

VEHICLE AND VEHICLE CONTROL METHOD

CROSS-REFERENCE TO RELATED APPLICATION

The present disclosure claims priority under 35 U.S.C. § 119 to Japanese Patent Application No. 2021-170489, filed on Oct. 18, 2021, which is incorporated herein by reference in its entirety.

BACKGROUND

Technical Field

The present disclosure relates to a vehicle and a vehicle control method.

Background Art

JP H09-294308 A discloses a hybrid electric vehicle including an electric motor for front wheels or rear wheels. In this hybrid electric vehicle, if an anti-lock braking system (ABS) is activated and release of a brake device is detected by a detection device, regenerative braking using the electric motor is temporarily interrupted even when the detection device detects a deceleration command from a driver. Also, with this interruption, a reverse torque acting in a direction opposite to the traveling direction of the vehicle is immediately transmitted by the electric motor to assist the braking of the vehicle.

SUMMARY

Control of an electric motor for generating regenerative torque for deceleration energy regeneration (hereinafter, referred to as "deceleration regeneration control" for convenience) may be performed at the time of deceleration caused by the accelerator pedal being released. At the time of deceleration, the brake pedal may be depressed after the deceleration regeneration control is started, and thereafter anti-lock brake control (ABS control) using the hydraulic brake may be activated. If the regenerative torque is carelessly decreased in order to reduce wheel slip in this situation, the deceleration may drop.

The present disclosure has been made in view of the problem described above, and an object of the present disclosure is to achieve both reduction of loss of deceleration caused by a decrease in regenerative torque generated by deceleration regeneration control and reduction of wheel slip, at the time of vehicle deceleration in which a brake pedal is depressed after an accelerator pedal is released.

A vehicle according to the present disclosure includes an electric motor, a brake device, and an electronic control unit. The electric motor is configured to drive at least one of a front wheel and a rear wheel. The brake device includes a brake actuator configured to control brake hydraulic pressure applied to each of the front wheel and rear wheel, and is configured to control upstream hydraulic pressure supplied to the brake actuator. The electronic control unit is configured to execute a regeneration process to control the electric motor so as to generate regenerative torque for deceleration energy regeneration during deceleration caused by an accelerator pedal being released. The electronic control unit is configured to execute a torque gradual decrease process to decrease the regenerative torque in a wheel slip detection state more gradually at a time when a brake pedal is depressed after a start of the deceleration and anti-lock brake control is not activated than a time when the brake pedal is not depressed after the start of the deceleration. The electronic control unit is configured to execute a hydraulic pressure increase process to increase the upstream hydraulic pressure such that, when the anti-lock brake control is activated while the brake pedal is depressed after the start of the deceleration, the upstream hydraulic pressure has a value necessary for generating a braking torque having a magnitude according to the regenerative torque generated at a start of the anti-lock brake control.

The regeneration process may include a feedforward process that, when the regenerative torque is decreased in a first wheel slip detection state at the time when the brake pedal is not depressed after the start of the deceleration, decreases the regenerative torque in a feedforward manner at a higher gradient in a first control period after arrival of the first wheel slip detection state than in a period of time after the first control period.

The regeneration process may include a feedback process that is started after the first control period. The feedback process may decrease the regenerative torque based on a difference between a target slip ratio and an actual slip ratio of either the front wheel or the rear wheel in the wheel slip detection state, and increase the regenerative torque in a wheel slip non-detection state. The electronic control unit may be configured to decrease the regenerative torque at a higher gradient when the feedback process is executed in the first wheel slip detection state than when the feedback process is executed in one or more wheel slip detection states that arrive after the first wheel slip detection state.

In the regeneration process, the electronic control unit may be configured to delay, by a standby time, a time point at which the feedback process is started, from a time point at which the first control period has elapsed.

A method according to the present disclosure is a method of controlling a vehicle including: an electric motor configured to drive at least one of a front wheel and a rear wheel; and a brake device including a brake actuator configured to control brake hydraulic pressure applied to each of the front wheel and rear wheel, the brake device being configured to control upstream hydraulic pressure supplied to the brake actuator. The method includes: a regeneration process to control the electric motor so as to generate regenerative torque for deceleration energy regeneration during deceleration caused by an accelerator pedal being released; a torque gradual decrease process to decrease the regenerative torque in a wheel slip detection state more gradually at a time when a brake pedal is depressed after a start of the deceleration and anti-lock brake control is not activated than a time when the brake pedal is not depressed after the start of the deceleration; and a hydraulic pressure increase process to increase the upstream hydraulic pressure such that, when the anti-lock brake control is activated while the brake pedal is depressed after the start of the deceleration, the upstream hydraulic pressure has a value necessary for generating a braking torque having a magnitude according to the regenerative torque generated at a start of the anti-lock brake control.

According to the present disclosure, when the brake pedal is depressed after the start of deceleration caused by the accelerator pedal being released and the anti-lock brake (ABS) control is not activated, the torque gradual decrease process described above is executed. This can reduce the loss of the deceleration as compared to an example in which the regenerative torque is decreased without the torque gradual decrease process after the brake pedal is depressed.

Also, when the ABS control is activated while the brake pedal is depressed after the start of the deceleration, the hydraulic pressure increase process described above is executed. As a result, even when the ABS control is activated after the execution of the torque gradual decrease process, the wheel slip can be reduced by using the ABS control while the braking torque according to the regenerative torque generated by the above-described regeneration process is secured. As described above, according to the present disclosure, at the time of deceleration of the vehicle in which the brake pedal is depressed after the accelerator pedal is released, it is possible to achieve both reduction of loss of the deceleration caused by a decrease in the regenerative torque generated by the regeneration process (deceleration regeneration control) and reduction of wheel slip.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. Configuration Example of Vehicle

Figure 1:
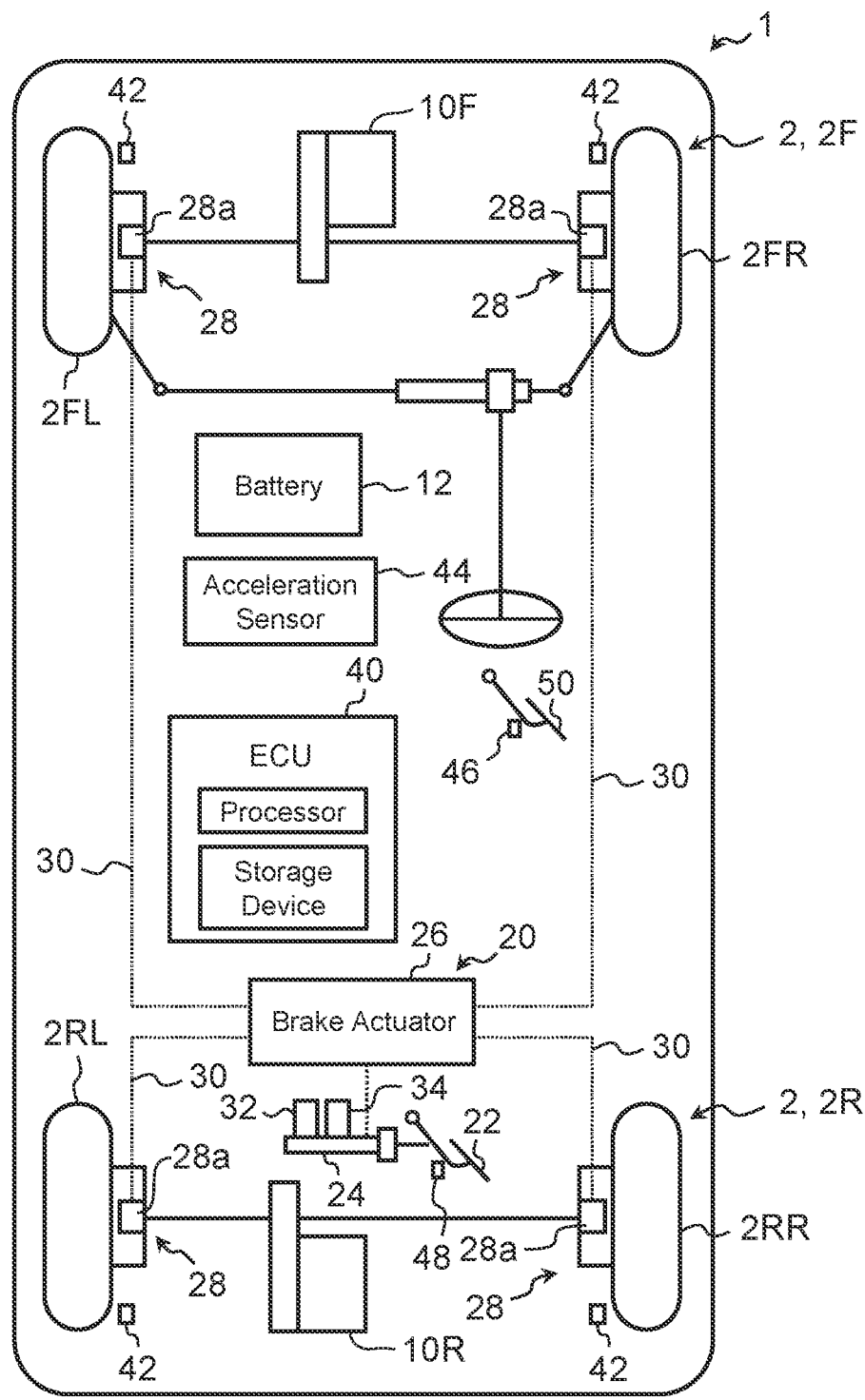
FIG. 1 is a diagram schematically illustrating an example of the configuration of a vehicle according to an embodiment.

FIG. 1 is a diagram schematically illustrating an example of the configuration of a vehicle 1 according to an embodiment. The vehicle 1 includes four wheels 2. In the following description, a left front wheel, a right front wheel, a left rear wheel, and a right rear wheel are referred to as 2FL, 2FR, 2RL, and 2RR, respectively. In addition, the front wheels may be collectively referred to as 2F, and the rear wheels may be collectively referred to as 2R.

The vehicle 1 includes an electric motor 10F configured to drive the front wheels 2F and an electric motor 10R configured to drive the rear wheels 2R. More specifically, as an example, the vehicle 1 is a battery electric vehicle (BEV) driven by the electric motors 10F and 10R that are operated by electric power supplied from a battery 12. However, the "vehicle" according to the present disclosure may be, for example, a hybrid electric vehicle (HEV) including an internal combustion engine together with one or more electric motors as the power sources of the vehicle. Also, in another example of the vehicle, one or more electric motors may be provided so as to drive only one of the front wheels and the rear wheels. Furthermore, the electric motors may be, for example, in-wheel motors provided in the wheels 2.

The vehicle 1 includes a brake device 20. The brake device 20 includes a brake pedal 22, a master cylinder 24, a brake actuator 26, brake mechanisms 28, and hydraulic pipes 30. The master cylinder 24 is configured to generate a hydraulic pressure according to the depression force of the brake pedal 22 and supply the generated hydraulic pressure (brake hydraulic pressure) to the brake actuator 26.

The brake actuator 26 includes a hydraulic circuit (not shown) interposed between the master cylinder 24 and the brake mechanisms 28. The hydraulic circuit includes a pump configured to increase the brake hydraulic pressure without depending on the master cylinder pressure, a reservoir for storing brake fluid, and a plurality of electromagnetic valves.

The brake mechanisms 28 are connected to the brake actuator 26 via the hydraulic pipes 30. The brake mechanisms 28 are arranged for the respective wheels 2. The brake actuator 26 is configured to distribute the brake hydraulic pressure to the brake mechanism 28 of each wheel 2. More specifically, the brake actuator 26 can supply the brake hydraulic pressure to the brake mechanism 28 of each wheel 2 using the master cylinder 24 or the above-described pump as a pressure source. Each of the brake mechanisms 28 has a wheel cylinder 28a that operates in accordance with the supplied brake hydraulic pressure.

Moreover, the brake actuator 26 can independently adjust the brake hydraulic pressure applied to each wheel 2 by controlling various electromagnetic valves provided in the hydraulic circuit. More specifically, the brake actuator 26 has a pressure increasing mode for increasing the pressure, a pressure holding mode for holding the pressure, and a pressure decreasing mode for decreasing the pressure as control modes of the brake hydraulic pressure. The brake actuator 26 can make the control mode of the brake hydraulic pressure different for each wheel 2 by controlling ON/OFF of various electromagnetic valves. The braking force applied to each wheel 2 is determined in accordance with the brake hydraulic pressure supplied to each wheel cylinder 28a. By changing the control mode in this manner, the brake actuator 26 can independently control the braking torque of each wheel 2.

Furthermore, the brake device 20 is configured to be able to control a brake hydraulic pressure (hereinafter, also referred to as an "upstream hydraulic pressure") supplied to the brake actuator 26. Specifically, in order to make it possible to increase the upstream hydraulic pressure (brake source pressure), the brake device 20 includes an electric pump 32, and an accumulator 34 that accumulates the brake hydraulic pressure increased by the electric pump 32. Also, in another example, an electric motor that can push the master cylinder 24 to increase the upstream hydraulic pressure may be provided.

The vehicle 1 further includes an electronic control unit (ECU) 40. The ECU 40 includes a processor, a storage device, and an input/output interface. The input/output interface receives sensor signals from various sensors mounted in the vehicle 1 and outputs operation signals to various actuators, such as the electric motors 10F and 10R, the brake actuator 26, and the electric pump 32. Various control programs for controlling the various actuators described above are stored in the storage device. The processor reads the control program from the storage device and executes the control program, whereby various controls using the various actuators described above are realized. It should be noted that the ECU 40 may be configured by combining a plurality of ECUs.

The various sensors described above include, for example, wheel speed sensors 42, an acceleration sensor 44, an accelerator position sensor 46, and a brake position sensor 48. The wheel speed sensors 42 are arranged for the respective wheels 2, and each output a wheel speed signal according to the rotation speed of the wheel 2. The acceleration sensor 44 outputs an acceleration signal according to the acceleration in the front-rear direction of the vehicle 1 (i.e., front/rear G). The accelerator position sensor 46 and the brake position sensor 48 output signals according to the amounts of depression of an accelerator pedal 50 and the brake pedal 22, respectively.

2. Control During Deceleration of Vehicle

The control performed by the ECU 40 during deceleration includes the following "deceleration regeneration control" and "anti-lock brake control (ABS control)".

The electric motors 10F and 10R shown in FIG. 1 not only function as electric motors that generate drive torque for driving the vehicle 1, but also function as generators that generate regenerative torque RT (negative torque) that acts on the wheels 2 during deceleration of the vehicle 1. In the deceleration regeneration control, during deceleration caused by an accelerator pedal OFF (hereinafter, also simply referred to as "accelerator OFF"), the electric motors 10F and 10R are controlled so as to generate the regenerative torque RT for deceleration energy regeneration. Details of the deceleration regeneration control will be described below with reference to FIGS. 3 and 4.

In the ABS control, the brake actuator 26 is controlled such that an actual slip ratio S of each wheel 2 becomes equal to a designated target slip ratio St. The actual slip ratio S of each wheel 2 can be calculated, for example, in accordance with the following Equation (1), based on wheel speed $V_W$ detected by the wheel speed sensor 42 and vehicle body speed V. The vehicle body speed V can be calculated (estimated) using, for example, a known method based on the wheel speed $V_W$ detected by the wheel speed sensor 42 and deceleration D detected by the acceleration sensor 44.

$$S = \frac{Vw - V}{V} \times 100 \qquad (1)$$

According to Equation (1), when any one of the wheels 2 tends to lock during deceleration, the wheel speed $V_W$ of the wheel 2 becomes lower than the vehicle body speed V, and the actual slip ratio S indicates a negative value. Therefore, when the amount of decrease in the wheel speed $V_W$ with respect to the vehicle body speed V increases, the actual slip ratio S decreases (i.e., increases to the negative side).

The start condition of the ABS control is determined based on, for example, whether or not the actual slip ratio S of the wheel 2 falls below a designated threshold value (negative value). During the operation of the ABS control, the brake actuator 26 controls the brake hydraulic pressure acting on the brake mechanisms 28 in order to bring the actual slip ratio S of the wheel 2 having the locking tendency close to the target slip ratio St. Specifically, first, the brake hydraulic pressure is reduced in order to lower the actual slip ratio S that has increased to the negative side, and then the brake hydraulic pressure is maintained. When the actual slip ratio S recovers (approaches zero) while the brake hydraulic pressure is maintained, the brake hydraulic pressure is increased. This kind of control of the brake hydraulic pressure is repeated during the execution of the ABS control. Thereafter, when the vehicle 1 stops or the actual slip ratio S of the wheel 2 having the locking tendency recovers to the designated threshold value or more, the ABS control is ended. According to the ABS control, locking of the wheel 1 can be avoided when the brake pedal 22 is depressed on a road surface with a low friction coefficient μ (i.e., on a low μ road).

During deceleration, the brake pedal 22 may be depressed after the deceleration regeneration control is started, and then the ABS control may be activated. In this situation, if the regenerative torque RT is carelessly decreased in order to reduce the wheel slip, the deceleration D (deceleration G) may drop off. In addition, when the regenerative torque RT generated by the deceleration regeneration control is increased in order to increase the energy regeneration amount, the generated deceleration D becomes higher. As a result, this kind of issue becomes remarkable.

In view of the above-described issue, in the present embodiment, at the time of deceleration of the vehicle 1 in which the brake pedal 22 is depressed after the accelerator OFF, the following control is performed in order to achieve both the reduction of the loss of the deceleration D caused by a decrease in the regenerative torque RT generated by the deceleration regeneration control and the reduction of the wheel slip.

2-1. Outline of Control

Figure 2:
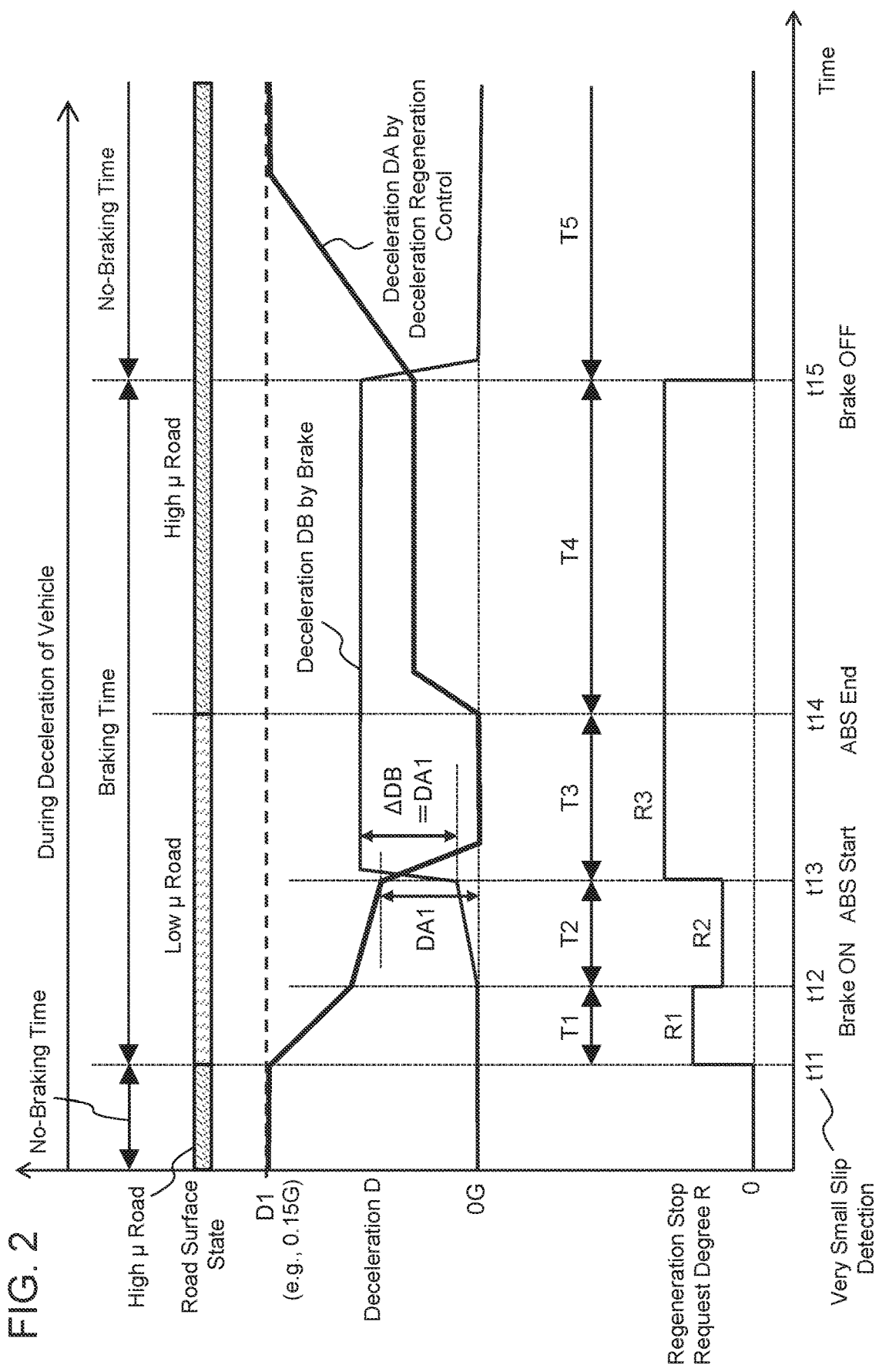
FIG. 2 is a time chart schematically showing an outline of control during deceleration of the vehicle according to the embodiment.

FIG. 2 is a time chart schematically showing an outline of control during deceleration of the vehicle 1 according to the embodiment. More specifically, the upper part of FIG. 2 shows a waveform (thick line) of deceleration DA generated by the regenerative torque RT by the deceleration regeneration control and a waveform (thin line) of deceleration DB generated by the braking torque by the brake device 20. The lower part of FIG. 2 shows a waveform of a regeneration stop request degree R that indicates the degree of the request for stopping the deceleration regeneration control.

In FIG. 2 which shows the time of deceleration in which the deceleration regeneration control is performed in response to the accelerator OFF, a period of time before a time point t12 (brake ON) at which the brake pedal 22 is depressed, that is, a period of time during the accelerator OFF and the brake OFF is also referred to as a "non-braking time". Also, a period of time from the time point t12 to a time point t15 at which the brake is OFF is also referred to as a "braking time". Moreover, a period of time after the time point t15 also corresponds to the "non-braking time".

D1 in FIG. 2 is a basic value of the deceleration D generated by the deceleration regeneration control, and more specifically, is a basic value of the deceleration D used when the vehicle 1 is not in a "wheel slip detection state (see step S106 described below)" during the execution of the deceleration regeneration control. This basic value D1 is, for example, 0.15G.

The road surface assumed in the example shown in FIG. 2 is as follows. That is, the road surface on which the vehicle 1 is traveling switches from a high μ road to a low μ road in the vicinity of a time point t11, and then returns from the low μ road to the high μ road in the vicinity of a time point t14. For this reason, in the period of time from the time point t11 to the time point t14 during which the vehicle 1 travels on the low μ road, the demand for reducing the slip of the wheel 2 becomes high.

In a period of time before the time point t11, the wheels 2 do not slip because the vehicle 1 is traveling on the high μ road. Therefore, the regeneration stop request degree R in this period of time is zero.

<Period of Time T1 (t11 to t12)>

Then, a wheel slip is detected at the time point t11. When the wheel slip detection state is established during non-braking in this way, "slip reduction control A" for reducing the wheel slip is performed. As will be described below in detail with reference to FIGS. 3 and 4, according to the slip reduction control A, the regenerative torque RT is decreased to reduce the deceleration DA for the purpose of the wheel slip reduction. Schematically, as shown in FIG. 2, the deceleration DA in a period of time T1 is gradually reduced in association with the decrease of the regenerative torque RT. The regeneration stop request degree R in this period of time T1 is the second highest value R1 in comparison with the other periods of time.

<Period of Time T2 (t12 to t13)>

Next, at the time point t12, the brake is ON. A period of time T2 from the time point t12 to a time point t13 corresponds to a braking time during which the ABS control is not activated. In the present embodiment, during this period of time T2, the ECU 40 executes the following "torque gradual decrease process".

As shown in FIG. 2, the torque gradual decrease process decreases the regenerative torque RT in the wheel slip detection state more gradually at the time when the brake pedal 22 is depressed (brake ON) after the start of the deceleration caused by the accelerator OFF and the ABS control is not activated (i.e., in the period of time T2) than the time when the brake pedal 22 is not depressed (brake OFF) after the start of the deceleration (i.e., in the period of time T1). The process of gradually decreasing the regenerative torque RT in this manner can be realized by, for example, making a control gain GN used in the period of time T2 (see the explanation of a "feedback (FB) process" described below) smaller than a control gain GN used in the period of time T1.

As a result of the regenerative torque RT being controlled in this manner, the deceleration DA in the period of time T2 decreases with a lapse of time at a gentler gradient than that in the period of time T1. In addition, in the period of time T2, as an example, the deceleration DB gradually increases with an increase in the braking torque of the brake device 20 caused by the brake ON.

Here, at the time of the braking after the brake ON, the ABS control that can reduce the wheel slip more reliably than the control of the regenerative torque RT by the deceleration regeneration control (i.e., the above-described slip reduction control A) is on standby. Therefore, even if the locking tendency becomes strong after the brake ON (in other words, even if the actual slip ratio S decreases), the ABS control can cope with the locking tendency. For this reason, a value R2 of the regeneration stop request degree R in the period of time T2 is lower than a value R1 in the period of time T1. In other words, in the period of time T2, in response to the fact that the brake is ON (that is, the fact that the braking is started), priority is given to the prevention of the loss of the deceleration G over the slip reduction.

<Period of time T3>

Next, at the time point t13, the start condition of the ABS control is satisfied, and the ABS control is started. Also, the regeneration stop request degree R is set to the highest value R3 because the slip reduction is performed by the ABS control. As a result, at the time point t13, the regenerative torque RT generated by the deceleration regeneration control is quickly decreased toward zero.

Furthermore, when the deceleration DB at the time point t13 is low (i.e., when the braking torque by the brake device 20 is low) as in the example shown in FIG. 2, the deceleration D drops if the regenerative torque RT of the deceleration regeneration control is simply controlled to zero in response to the start of the ABS control. In order to avoid this, in the present embodiment, the ECU 40 executes the following "hydraulic pressure increase process" at the time point t13.

The hydraulic pressure increase process is a process of increasing the upstream hydraulic pressure such that, when the ABS control is activated at the time when the brake is ON after the start of the deceleration caused by the accelerator OFF (i.e., during a period of time T3 from the time point t13 to the time point t14 at which the ABS control is ended), the upstream hydraulic pressure has a value necessary to generate a braking torque having a magnitude according to the regenerative torque RT at the start of the ABS control (i.e., the time point t13). The upstream hydraulic pressure is increased by the brake device 20. More specifically, in the example of the vehicle 1 having the configuration shown in FIG. 1, the electric pump 32 (see FIG. 1) is controlled to increase the upstream hydraulic pressure. In other words, the upstream hydraulic pressure is raised so as to increase the deceleration DB by an amount of change ΔDB equal to the magnitude DA1 of the deceleration DA at the start of the ABS control (i.e., the time point t13). This makes it possible to reduce a change in the deceleration D caused by performing the ABS control while temporarily stopping the deceleration regeneration control.

<Period of Time T4>

Next, a period of time T4 from the time point t14 to the time point t15 of the brake OFF will be described. As described above, the road surface on which the vehicle 1 travels returns to the high μ road in the vicinity of the time point t14. As a result, at the time point t14, the wheel slip detection state is cleared, and the ABS control is ended. Accordingly, the deceleration regeneration control is resumed. Specifically, the deceleration DA is increased by increasing the regenerative torque RT. However, as shown in FIG. 2, the deceleration DB is increased so as to compensate for the decrease in the deceleration DA at the time point t13 at which the ABS control is started. Therefore, if the regenerative torque RT is excessively increased at the time point t14, the total deceleration D (=DA+DB) exceeds the basic value D1. In addition, the hydraulic pressure increase process for increasing the upstream hydraulic pressure is continued until the brake pedal 22 is released (brake OFF) at the time point t15.

Accordingly, at the time point t14, the regenerative torque RT generated by the deceleration regeneration control is increased so as to obtain the deceleration DA necessary for preventing the total deceleration D (=DA+DB) from exceeding the basic value D1.

<Period of Time T5>

Next, a period of time T5 at or after the time point t15 will be described. When the brake OFF is detected at the time point t15, the braking torque generated by the brake device 20 is made zero, and the deceleration DB becomes zero. Accordingly, as shown in FIG. 2, the regenerative torque RT generated by the deceleration regeneration control is increased such that the deceleration DA returns to the basic value D1.

2-2. Details of Control During Non-Braking Time

Figure 3:
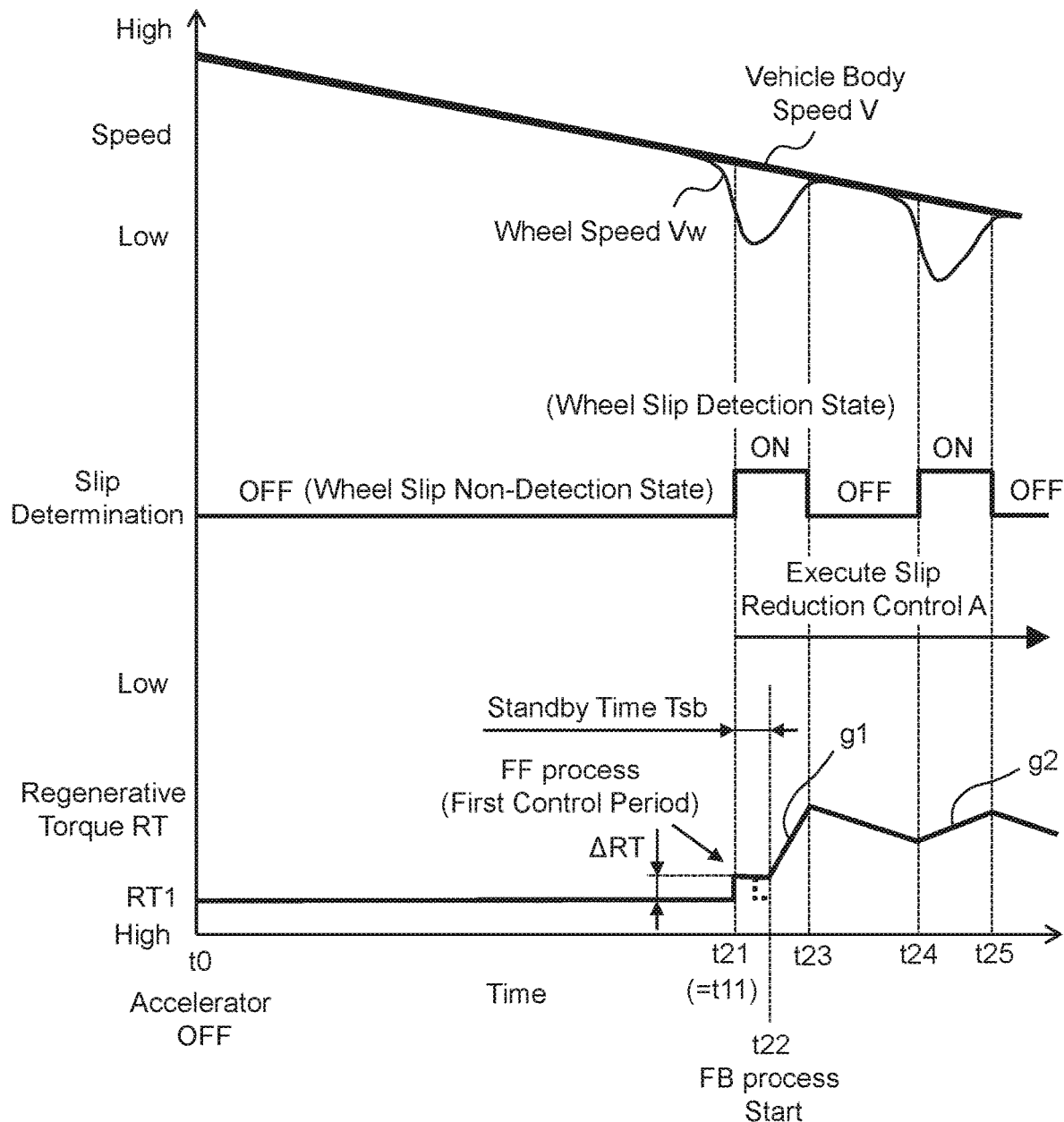
FIG. 3 is a time chart schematically showing the control of regenerative torque RT generated by a deceleration regeneration control during non-braking before a brake pedal is depressed.

FIG. 3 is a time chart schematically showing the control of the regenerative torque RT generated by the deceleration regeneration control during non-braking before the brake pedal 22 is depressed. It should be noted that the regenerative torque RT shown in FIG. 3 is a total value of the regenerative torques acting on the wheels driven by the electric motor used for the deceleration regeneration control. In the example of the vehicle 1 shown in FIG. 1, the regenerative torque RT is the total value of the regenerative torques of the front wheels 10F and the rear wheels 10R driven by the electric motor 2F and the electric motor 2R, respectively.

The deceleration regeneration control is started when the accelerator OFF is detected at the time point t0. A time point t21 in FIG. 3 is a time point at which the wheel slip is first detected after the start of deceleration, and corresponds to the time point t11 in FIG. 2. In a period of time before the time point t21, the wheel slip is not detected because the vehicle 1 is traveling on the high μ road. Therefore, the regenerative torque RT is controlled so as to have the basic value RT1 for generating the basic value D1 of the deceleration D shown in FIG. 2.

The deceleration regeneration control includes the slip reduction control A for reducing the wheel slip. The slip reduction control A is started when a slip determination becomes the ON state (i.e., the wheel slip detection state) at the time point t21. It should be noted that the deceleration regeneration control according to the present embodiment is realized by the ECU 40 executing the "regeneration process" according to the present disclosure. Therefore, the slip reduction control A included in the deceleration regeneration control is also realized by the ECU 40 executing the "regeneration process".

Figure 4:
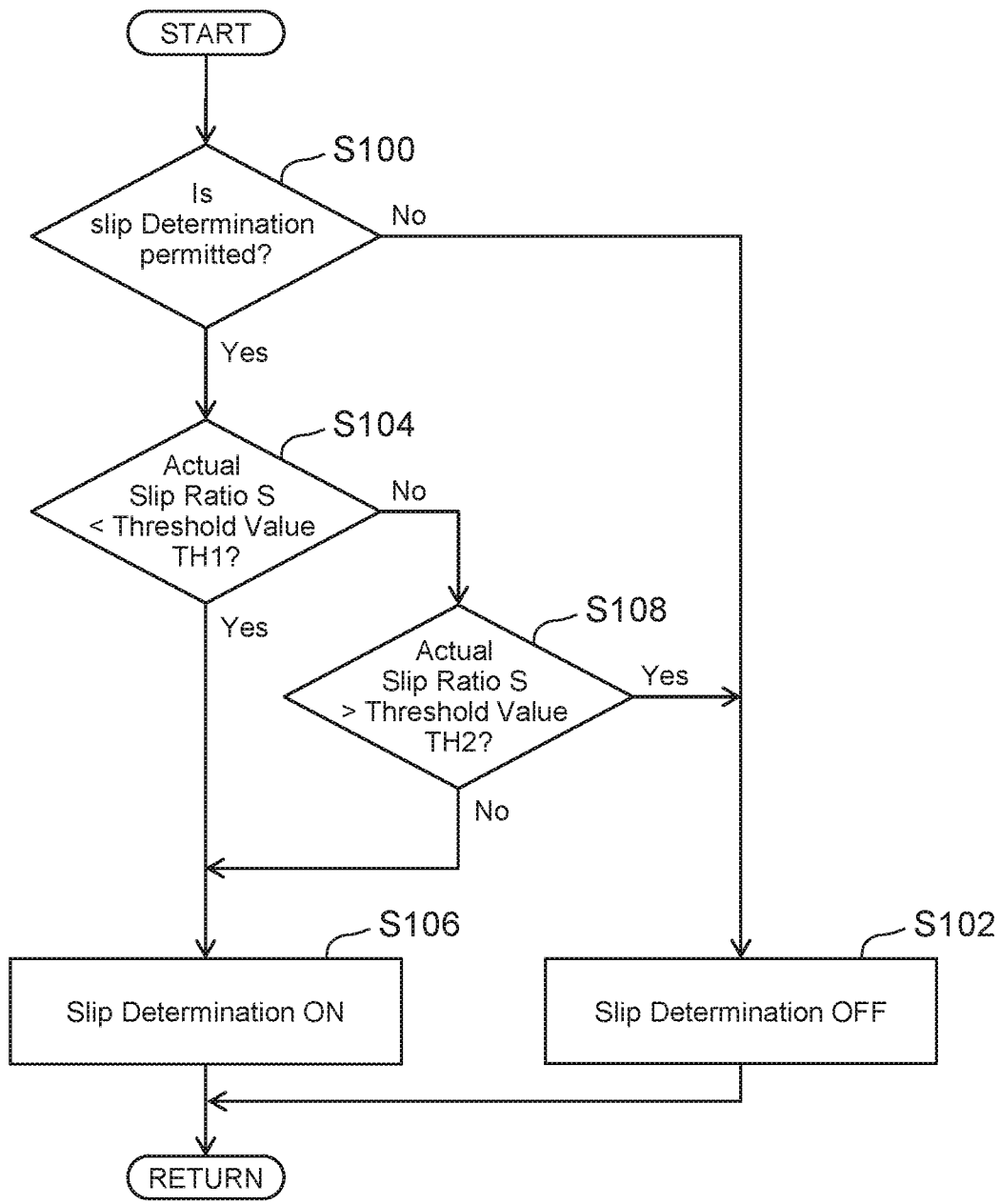
FIG. 4 is a flowchart showing a process related to slip determination shown in FIG. 3.

FIG. 4 is a flowchart showing a process related to the slip determination shown in FIG. 3. The processing of this flowchart is repeatedly executed at a designated control period.

In FIG. 4, first, in step S100, the ECU 40 determines whether or not the condition is such that the slip determination can be executed. Specifically, for example, the ECU 40 determines whether or not the wheel speed sensor 42 is normal.

As a result, when the slip determination cannot be executed (in other words, when the slip determination is not permitted), the processing proceeds to step S102, and the slip determination is turned OFF. On the other hand, when the slip determination can be executed (in other words, when the slip determination is permitted), the processing proceeds to step S104.

In step S104, the ECU 40 determines whether or not the actual slip ratio S is lower than a designated threshold value TH1. According to the actual slip ratio S calculated by Equation (1) described above, when the slip amount in an example in which the wheel 2 tends to be locked during deceleration increases, the actual slip ratio S increases to the negative side. In addition, in order to be able to detect the wheel slip at an early stage and quickly start correcting the regenerative torque RT to reduce the slip, this designated threshold value TH1 is, for example, set to such a value as to be able to detect a very small slip as compared to a range of the actual slip ratio S subject to the ABS control. Specifically, the designated threshold value TH1 is −3%, for example.

When the determination result of step S104 is Yes (S<TH1), the processing proceeds to step S106, and the slip determination is turned ON. That is, the above-described wheel slip detection state is established. On the other hand, when the determination result of step S104 is No (S≥TH1), the processing proceeds to step S108.

In step S108, the ECU 40 determines whether or not the actual slip ratio S is higher than a designated threshold value TH2. The threshold value TH2 is a value greater than the threshold value TH1 (i.e., a value closer to zero) and is −1%, for example.

When the determination result of step S108 is No (TH1≤S≤TH2), the processing proceeds to step S106, and the slip determination is turned ON. On the other hand, when the determination result of step S108 is Yes (S>TH2), the processing proceeds to step S102, and the slip determination is turned OFF.

According to the slip determination process shown in FIG. 4, when the actual slip ratio S decreases in association with an increase in the slip amount after the wheel slip occurs, first, the determination result of step S104 becomes Yes, and the slip determination is turned ON. Thereafter, in a process in which the slip amount decreases and the actual slip ratio S returns to zero, the slip determination is ON until the actual slip ratio S exceeds the threshold value TH2 that is greater than the threshold value TH1.

The wheel slip during deceleration of the vehicle 1 may occur intermittently multiple times. In the example shown in FIG. 3, the wheel slip (i.e., the slip determination ON state) occurs twice. The slip reduction control A is performed as follows after the slip determination ON state is obtained for the first time after the start of the deceleration at the time point t21.

<Feedforward (FF) Process in First Control Period>

In the slip reduction control A, the ECU 40 starts to decrease the regenerative torque RT when the first wheel slip detection state (i.e., the slip determination ON state) arrives at the time point t21 after the accelerator OFF. At this time, the ECU 40 executes a feedforward process for decreasing the regenerative torque RT in a feedforward (FF) manner with a higher gradient in a first control period after the arrival of the first wheel slip detection state than in a period of time after the first control period.

Specifically, in order to quickly reduce the wheel slip caused by the switching of the road surface from the high μ road to the low μ road, it is favorable to quickly decrease the regenerative torque RT. However, if the regenerative torque RT is decreased too much, the driver feels that the deceleration D (deceleration G) has been lost.

Accordingly, in the first control period, the ECU 40 decreases the regenerative torque RT by a decrease amount ΔRT according to a decrease amount (for example, 0.03G) of the deceleration D obtained in advance so as to have a value as large as possible while reducing the occurrence of the feeling of losing the deceleration D. More specifically, this decrease amount ΔRT is determined in advance on the basis of the decrease amount of the deceleration D. The ECU 40 controls the electric motors 10F and 10R such that the regenerative torque RT decreases by the decrease amount ΔRT in the first control period.

<Setting of Standby Time Tsb>

After the regenerative torque RT is decreased in the feedforward manner as described above in the first control period, the ECU 40 executes the following feedback process (FB process). However, as shown in FIG. 3, the ECU 40 delays a start time point t22 of the FB process by a designated standby time Tsb with respect to a time point at which the first control period has elapsed. This standby time Tsb is, for example, 72 ms.

The wheel slip may be converged (eliminated) during the elapse of the standby time Tsb after the start of the slip reduction control A. Unlike an example in which the road surface on which the vehicle 1 is traveling switches from a high μ road to a low μ road, this kind of phenomenon may occur, for example, when the vehicle 1 passes through a step. Accordingly, when the wheel slip converges during the elapse of the standby time Tsb, the regenerative torque RT may be quickly returned to the basic value RT1 as indicated by a broken line in FIG. 3.

<Feedback (FB) Process>

The FB process is executed as follows, for example. That is, in the FB process, the ECU 40 decreases the regenerative torque RT based on a difference ΔS between the actual slip ratio S of the wheel 2 in which the slip occurs and the target slip ratio St (for example, zero) in the wheel slip detection state (for example, the period of time from the time point t22 to a time point t23). More specifically, for example, the ECU 40 decreases the regenerative torque RT by a control amount obtained by multiplying the absolute difference ΔS by the control gain GN. As a result, the amount of decrease in the regenerative torque RT increases when the absolute value of the difference ΔS increases, and increases when the control gain GN increases.

In FIG. 3, the wheel slip is converged at the time point t23. As a result, the slip determination becomes an OFF state (i.e., the wheel slip non-detection state). In the FB process, the ECU 40 increases the regenerative torque RT in the wheel slip non-detection state in which the wheel slip is converged (for example, in a period of time from the time point t23 to a time point t24). To be more specific, the regenerative torque RT is gradually returned (for example, at a constant gradient) toward the basic value RT1 with a lapse of time.

Furthermore, when the FB process is executed in the first wheel slip detection state, the ECU 40 decreases the regenerative torque RT at a higher gradient (time rate of change) than when the FB process is executed in one or more wheel slip detection states that occur after the first wheel slip detection state. To be more specific, in the example shown in FIG. 3 in which the wheel slip detection state occurs twice, the regenerative torque RT is controlled such that a gradient g1 of the regenerative torque RT in the first wheel slip detection state is higher than a gradient g2 of the regenerative torque RT in the second wheel slip detection state.

The difference in the gradient (time rate of change) of the regenerative torque RT as described above can be realized, for example, by making the value of the control gain GN used in the first wheel slip detection state greater than the value of the control gain GN used in the second wheel slip detection state. The values of these control gains GN are determined in advance.

In addition, the control gain GN is determined such that not only the gradient g2 that is gentler than the gradient g1 but also the gradient g1 does not give the driver a feeling of losing the deceleration D. Also, the second gradient g2 (i.e., the gradient in the wheel slip detection state that occurs again during recovery when the regenerative torque RT is increasing so as to return to the basic value RT1) may be about a half of the first gradient g1 in order to avoid fluctuation of the deceleration D. Moreover, when the vehicle 1 slips again in this way, the regenerative torque RT may be decreased such that the deceleration DA is reduced by a designated decrease amount (for example, 0.02G).

As a result of execution of the slip reduction control A as described above, the deceleration DA decreases with a lapse of time as shown in the period of time T1 in FIG. 2. In addition, although the "FB process" included in the slip reduction control A is described above as the control during non-braking, the FB process is also executed in the period of time T2 from the depression of the brake pedal 22 to the start of the ABS control.

2-3. Details of Control During Braking

Figure 5:
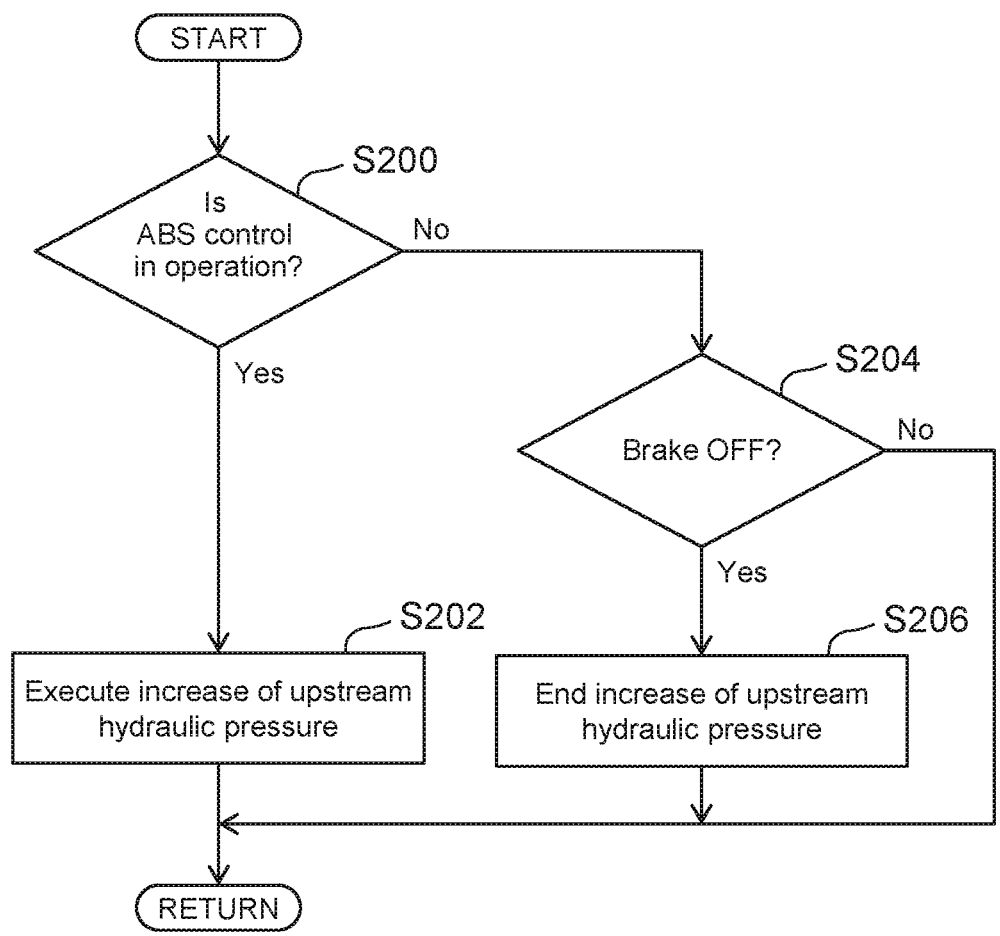
FIG. 5 is a flowchart illustrating a hydraulic pressure increase process shown in FIG. 2.

FIG. 5 is a flowchart illustrating the hydraulic pressure increase process shown in FIG. 2. The processing of this flowchart is repeatedly executed at a designated control period after the brake is ON after the start of deceleration caused by the accelerator OFF.

In FIG. 5, first, in step S200, the ECU 40 determines whether or not the ABS control is in operation. As a result, when the ABS control is in operation, the processing proceeds to step S202.

In step S202, the ECU 40 increases the upstream hydraulic pressure by controlling the electric pump 32 (see FIG. 1). More specifically, as described above, the upstream hydraulic pressure is increased to a value necessary to generate a braking torque having a magnitude according to the regenerative torque RT at the start of the ABS control (i.e., at the time point t13 in FIG. 2).

On the other hand, when the ABS control is not in operation in step S200, the processing proceeds to step S204. In step S204, the ECU 40 determines whether or not the brake pedal 22 is released (the brake OFF). As a result, when the brake is not OFF, the processing proceeds to RETURN. That is, the upstream hydraulic pressure is maintained at the last value. On the other hand, when the brake is OFF, the processing proceeds to step S206, and the increase of the upstream hydraulic pressure is ended.

According to the processing shown in FIG. 5, when the operation of the ABS control is started, the increase of the upstream hydraulic pressure is started, and the increase of the upstream hydraulic pressure is maintained during the execution of the ABS control. Also, according to the processing shown in FIG. 5, the increase of the upstream hydraulic pressure is continued until the brake is released (the brake OFF) even after the end of the ABS control. As a result, even during braking after the end of the ABS control, the deceleration D is prevented from dropping off.

2-4. Effect

As described above, according to the present embodiment, when the brake pedal 22 is depressed after the start of deceleration caused by the accelerator OFF and the ABS control is not activated (for example, during the period of time T2 in FIG. 2), the torque gradual decrease process is executed. That is, the regenerative torque RT in the wheel slip detection state is gradually decreased as compared to when the brake pedal 22 is not depressed after the start of the deceleration (for example, the period of time T1 in FIG. 2). This makes it possible to return the loss of the deceleration D as compared to an example in which the regenerative torque RT is decreased without the torque gradual decrease process after the brake pedal 22 is depressed. Also, when the ABS control is activated while the brake pedal 22 is depressed after the start of the deceleration, the hydraulic pressure increase process is executed. As a result, even in a situation where the ABS control is activated after the execution of the torque gradual decrease process as in the example shown in FIG. 2, the slip can be reduced by using the ABS control in a state while the braking torque according to the regenerative torque RT generated by the deceleration regeneration control is secured.

As described above, according to the present embodiment, during the deceleration of the vehicle 1 in which the brake pedal 22 is depressed after the start of the deceleration caused by the accelerator OFF, it is possible to reduce both the reduction of loss of the deceleration D caused by a decrease in the regenerative torque RT generated by the deceleration regeneration control and the reduction of the wheel slip.

Moreover, according to the present embodiment, when the regenerative torque RT is decreased in the initial wheel slip detection state in which the brake pedal 22 is not depressed after the start of deceleration caused by the accelerator OFF, the FF process is executed in the initial control period after the arrival of the initial wheel slip detection state to decrease the regenerative torque RT in a feedforward manner with a higher gradient than in the period of time after the initial control period. If the FB process is immediately started from the first control period without this kind of FF process, the decrease of the regenerative torque RT is delayed. On the other hand, according to the FF process executed in the first control period, the regenerative torque RT can be quickly decreased at a high gradient by a predetermined amount, and thus the slip reduction can be quickly started. More specifically, according to the slip determination of the present embodiment (see FIG. 4), it is possible to detect a very small slip and quickly start the decrease of the regenerative torque RT. In addition, the decrease amount $\Delta$RT of the regenerative torque RT is determined in advance based on the decrease amount of the deceleration D obtained in advance so as to become a value as large as possible while reducing the occurrence of the feeling of losing the deceleration D. Therefore, it is possible to quickly decrease the regenerative torque RT in order to reduce the slip while considering the loss of the deceleration D.

Moreover, according to the present embodiment, when the FB process is executed in the first wheel slip detection state after the start of the deceleration (for example, the time point t22 to the time point t23 in FIG. 3), the regenerative torque RT is decreased at a higher gradient than when the FB process is executed in one or more wheel slip detection states coming after the first wheel slip detection state (for example, the time point t24 to the time point t25 in FIG. 3). As a result, the slip reduction can be reliably performed at the initial stage after the start of the deceleration, and the slip reduction can also be performed while reducing the loss of the deceleration D when the wheel slip is detected thereafter.

Furthermore, according to the present embodiment, a process is executed in which the time point at which the FB process is started in the first wheel slip detection state after the start of the deceleration is delayed by the standby time Tsb with respect to the time point at which the first control period has elapsed. As described above, unlike the example in which the road surface on which the vehicle 1 is traveling switches from the high μ road to the low u road, when, for example, the vehicle 1 passes through a step, there is a possibility that the wheel slip may occur instantaneously. In this situation, if the FB process is started immediately after the FF process, there is a possibility that the regenerative torque RT may be unnecessarily largely changed and the deceleration D may be largely changed as a result. On the other hand, by providing the standby time (delay time) Tsb until the FB process is started after the FF process as in the present embodiment, it is possible to prevent the deceleration D from changing in response to an instantaneous vibration of the actual slip ratio S which occurs when, for example, the vehicle 1 passes through the step.

It should be noted that, unlike the embodiment described above, the "torque gradual decrease process" and the "hydraulic pressure increase process" during braking according to the present disclosure may not necessarily be executed together with the "feedforward process" during non-braking. Specifically, when the "torque gradual decrease process" and the "hydraulic pressure increase process" are performed during braking, the regenerative torque may be controlled during non-braking by, for example, a process different from the "feedforward process" (and the "feedback process") described above.

What is claimed is:
1. A vehicle, comprising:
an electric motor configured to drive at least one of a front wheel and a rear wheel;
a brake device including a brake actuator configured to control brake hydraulic pressure applied to each of the front wheel and rear wheel, the brake device being configured to control upstream hydraulic pressure supplied to the brake actuator; and
an electronic control unit configured to execute:
a regeneration process to control the electric motor so as to generate regenerative torque for deceleration energy regeneration during deceleration caused by an accelerator pedal being released;
a torque gradual decrease process to decrease the regenerative torque in a wheel slip detection state more gradually at a time when a brake pedal is depressed after a start of the deceleration and anti-lock brake control is not activated than a time when the brake pedal is not depressed after the start of the deceleration; and
a hydraulic pressure increase process to increase the upstream hydraulic pressure such that, when the anti-lock brake control is activated while the brake pedal is depressed after the start of the deceleration, the upstream hydraulic pressure has a value necessary for generating a braking torque having a magnitude according to the regenerative torque generated at a start of the anti-lock brake control.

2. The vehicle according to claim 1, wherein
the regeneration process includes a feedforward process that, when the regenerative torque is decreased in a first wheel slip detection state at the time when the brake pedal is not depressed after the start of the deceleration, decreases the regenerative torque in a feedforward manner at a higher gradient in a first control period after arrival of the first wheel slip detection state than in a period of time after the first control period.

3. The vehicle according to claim 2, wherein
the regeneration process includes a feedback process that is started after the first control period,
the feedback process decreases the regenerative torque based on a difference between a target slip ratio and an actual slip ratio of either the front wheel or the rear wheel in the wheel slip detection state, and increases the regenerative torque in a wheel slip non-detection state, and
the electronic control unit is configured to decrease the regenerative torque at a higher gradient when the feedback process is executed in the first wheel slip detection state than when the feedback process is executed in one or more wheel slip detection states that arrive after the first wheel slip detection state.

4. The vehicle according to claim 3, wherein
in the regeneration process, the electronic control unit is configured to delay, by a standby time, a time point at which the feedback process is started, from a time point at which the first control period has elapsed.

5. A method of controlling a vehicle including: an electric motor configured to drive at least one of a front wheel and a rear wheel; and
a brake device including a brake actuator configured to control brake hydraulic pressure applied to each of the front wheel and rear wheel, the brake device being configured to control upstream hydraulic pressure supplied to the brake actuator, the method comprising:

a regeneration process to control the electric motor so as to generate regenerative torque for deceleration energy regeneration during deceleration caused by an accelerator pedal being released;

a torque gradual decrease process to decrease the regenerative torque in a wheel slip detection state more gradually at a time when a brake pedal is depressed after a start of the deceleration and anti-lock brake control is not activated than a time when the brake pedal is not depressed after the start of the deceleration; and a hydraulic pressure increase process to increase the upstream hydraulic pressure such that, when the anti-lock brake control is activated while the brake pedal is depressed after the start of the deceleration, the upstream hydraulic pressure has a value necessary for generating a braking torque having a magnitude according to the regenerative torque generated at a start of the anti-lock brake control.

* * * * *